(12) United States Patent
Muenster et al.

(10) Patent No.: US 8,383,221 B2
(45) Date of Patent: Feb. 26, 2013

(54) MULTI-LAYER FILM

(75) Inventors: Jochen Muenster, Zielebach (CH); Beat Allemann, Bern (CH); Alain Eckert, Bern (CH)

(73) Assignee: Kloeckner Pentaplast GmbH & Co. KG, Heiligenroth (DE)

( * ) Notice: Subject to any disclaimer, the term of this patent is extended or adjusted under 35 U.S.C. 154(b) by 42 days.

(21) Appl. No.: 13/127,258

(22) PCT Filed: Nov. 3, 2009

(86) PCT No.: PCT/EP2009/007844
§ 371 (c)(1),
(2), (4) Date: May 11, 2011

(87) PCT Pub. No.: WO2010/051960
PCT Pub. Date: May 14, 2010

(65) Prior Publication Data
US 2011/0210037 A1 Sep. 1, 2011

(30) Foreign Application Priority Data
Nov. 6, 2008 (DE) .................. 10 2008 056 123

(51) Int. Cl.
*B29D 23/00* (2006.01)

(52) U.S. Cl. .................. 428/36.91; 428/36.6; 428/36.7

(58) Field of Classification Search .................. 428/34.1, 428/36.6, 36.7, 36.91; 206/532, 538, 471, 206/531
See application file for complete search history.

(56) References Cited

U.S. PATENT DOCUMENTS

| | | | | | |
|---|---|---|---|---|---|
| 5,991,047 | A | * | 11/1999 | Kohlert et al. | 356/429 |
| 6,113,927 | A | * | 9/2000 | Hatakeyama | 424/401 |
| 6,218,024 | B1 | * | 4/2001 | Tamber et al. | 428/520 |
| 7,000,769 | B2 | * | 2/2006 | Killinger | 206/534 |
| 2005/0139505 | A1 | | 6/2005 | Miller et al. | |
| 2006/0081495 | A1 | * | 4/2006 | Killinger | 206/532 |
| 2006/0283758 | A1 | * | 12/2006 | Pasbrig | 206/531 |
| 2007/0284280 | A1 | * | 12/2007 | Young | 206/538 |
| 2011/0210037 | A1 | * | 9/2011 | Muenster et al. | 206/531 |

FOREIGN PATENT DOCUMENTS

| | | |
|---|---|---|
| DE | 602 09 812 T2 | 9/2006 |
| EP | 1 468 817 A1 | 10/2004 |
| EP | 1 655 237 A1 | 5/2006 |
| EP | 2 033 775 A1 | 3/2009 |
| WO | WO 2008/014862 A1 | 2/2008 |
| WO | WO 2008/033404 A1 | 3/2008 |

* cited by examiner

*Primary Examiner* — N. Edwards
(74) *Attorney, Agent, or Firm* — ProPat, L.L.C.

(57) ABSTRACT

The present invention relates to a deep-drawable multi-layer film having low water vapor and oxygen permeability, the inventive film being suitable for blister packaging and preferably including a layer composite specifically a PVC/PVDC/PCTFE/PVC composite.

28 Claims, 1 Drawing Sheet

MULTI-LAYER FILM

CROSS-REFERENCE TO RELATED APPLICATIONS

This application is being filed under Rule 1.371 as a National Stage Application of pending International Application No. PCT/EP2009/007844 filed Nov. 3, 2009, which claims priority to the following parent application: German Patent Application No. 10 2008 056 123.1, filed Nov. 6, 2008. Both International Application No. PCT/EP2009/007844 and German Patent Application No. 10 2008 056 123.1 are hereby incorporated by reference herein in their entirety.

FIELD OF THE INVENTION

The present invention relates to a multilayer film with low water vapor transmission and with low oxygen transmission, and with particular suitability for blister packs for medicaments.

BACKGROUND OF THE INVENTION

The barrier effect of polymeric materials and films with respect to water vapor is generally independent of the barrier effect with respect to oxygen. Accordingly, materials exhibiting a good vapor barrier will not necessarily also exhibit a good barrier with respect to oxygen and to odors, and vice versa. The only material that exhibits a barrier effect in a moderate to good range of values not only with respect to oxygen but also with respect to water vapor is polyvinylidene chloride (PVDC). PCTFE, polyolefins, and other polymers exhibit a good to very good water vapor barrier but a very low oxygen barrier. EVOH (ethylene-vinyl alcohol copolymer) exhibits a very good oxygen barrier, but a low water vapor barrier. There is currently no available polymeric packaging film that is marketable, i.e. that can be produced cost-effectively, and that exhibits a high water vapor barrier alongside a high oxygen barrier. On the other hand, modern medicaments are increasingly proving to be sensitive to water vapor and oxygen. The requirements placed upon the barrier effect exhibited by packaging films for medicaments are accordingly ever more stringent. The requirement hitherto has been for a large barrier effect mainly with respect to water vapor, but packaging films for modern medicaments now also have to exhibit a large barrier effect with respect to oxygen.

Thermoformable plastics films are widely used for the packaging of food and drink, medicaments, and other products. The products known as blister packs are important here. Blister packs have a shape matched to the product and obtained by thermoforming of a flat, preferably transparent plastics film. The packaging component that conforms to the respective product or contents is also termed base component, and after the contents have been charged it is sealed with a lid film, preferably an aluminum film, by a welding or sealing process. The packaging has to comply with particular requirements in respect of the barrier effect thereof with respect to water vapor, oxygen and sometimes other gases, such as carbon dioxide, and these requirements depend on the intended application. By way of example, a wide variety of medicaments require packaging exhibiting a water vapor transmission of less than 0.06 g/(m²·24 h), and in some cases less than 0.04 g/(m²·24 h). In the case of transparent films, the only way of achieving water vapor transmission of less than 0.06 g/(m²·24 h) is to use PCTFE as film material with a thickness greater than 100 μm. Water vapor transmission below 0.04 g/(m²·24 h) has hitherto been achievable only by using aluminum film, in particular by using what is known as "cold form film". Aluminum films of this type are not transparent and they moreover have low deformability, and cannot therefore be used to produce relatively small blisters, so that the film area needed is substantially greater than when a thermoformable blister is used.

Thermoformable plastics films have to have not only a larger barrier effect but also other properties, such as sealability, freedom from streaks, low thickness, uniform thickness profile, and good processability. For the processability, especially advantageous features are good deformability, i.e. maximum uniformity of thickness distribution in the component after the deforming process, and also maximum shape replication, minimum curl, and a small coefficient of friction, i.e. good slip capability with respect to the machinery parts contacted and the packaged contents. The curl occurs in two- or multilayer composite films when the coefficients of thermal expansion (CTEs) of the individual layer materials differ.

Thermoforming plastics films for packaging exhibiting barrier effect with respect to water vapor are known in the prior art.

EP 1 655 237 A1 discloses a thermoformed or cold-formed blister pack with a blister base component and with a lid film. The lid film is composed of an aluminum film of thickness from 10 to 30 μm which has been laminated or coated with, on a first side, a film which can be peeled from the aluminum film and which is made of at least one plastics layer based on thermoplastic or thermoset polymers and, on the second side, sealed against the blister base component, a plastics film based on polyvinyl chloride (PVC) having a film thickness of from 10 to 40 μm, or polyvinylidene chloride (PVDC) having a film thickness of from 10 to 40 μm, or polypropylene (PP) having a film thickness of from 6 to 35 μm, or polyethylene (PE) having a film thickness of from 6 to 35 μm, or polyester having a film thickness of from 5 to 10 μm, or polychlorotrifluoroethylene (PCTFE) having a film thickness of from 8 to 30 μm, or cycloolefin copolymers (COCs), or cycloolefin polymers (COPs) having a thickness of from 10 to 40 μm. The blister base component is composed, at least on the side sealed against the lid film, of a material having a chemical structure compatible with that of the plastics films sealed against the blister base component. The film that can be peeled from the aluminum film is composed of one or more layers made of one or more of the following plastics: PVC, PVDC, PCTFE, PP, PE, polyester, polyethylene naphthalate (PEN), polyamide (PA), COC, COP, polystyrene (PS), or cellophane.

EP 1 468 817 A1 (whose United States equivalent is United States Publication No. 2007/068842 A1 relates to a lid film for blister packs with thermoformed or cold-formed blister base components. The lid film encompasses an aluminum film of thickness from 5 to 30 μm which has been laminated, on a side provided for sealing with respect to a blister base component, with a plastics film based on PVC having a film thickness of from 10 to 40 μm, or PVDC having a film thickness of from 10 to 40 μm, or PP having a film thickness of from 6 to 35 μm, or polyester having a film thickness of from 5 to 15 μm, or PCTFE having a film thickness of from 8 to 76 μm, or COC having a thickness of from 10 to 40 μm. Blister base components are composed by way of example of films made of PVC, PP, PET, PE, and of composite films, such as PVC/ACLAR® (PCTFE), PVC/PVDC, and COC, or Al—Al blisters.

DE 602 09 812 T2 (whose United States equivalent is United States Publication No. 2003/099813 A1 describes an at least single-layer polymer film, where one of the layers encompasses a vinylidene chloride composition which encompasses 100 parts by weight of vinylidene chloride copolymer; from 0.1 to 10 parts by weight of stabilizer, from 0.1 to 10 parts by weight of lubricant, and from 0.1 to 10 parts by weight of hydrophilic clay. By way of example, the structure of the polymer film is of the following type: C/A/B, B/A/D/B, or C/A/D/C, where A stands for PVDC.

The packaging films known in the prior art exhibit inadequate barrier effect with respect to water vapor and oxygen, or require the use of considerable amounts of PCTFE, of an aluminum film, or of inorganic additives. These measures are associated with increased costs in the case of PCTFE, or impair processability and other properties, such as optical transparency.

PCTFE film exhibits a very good water vapor barrier, but a low oxygen barrier. An increase in the thickness of a PCTFE film can in principle raise the water vapor barrier, but because of indirect proportionality between material thickness and water vapor transmission the thickness of PCTFE needed rises rapidly into a range which is technically and economically very disadvantageous, and there is no possibility of achieving an oxygen barrier adequate for highly demanding packaging applications. PVDC, on the other hand, exhibits a very good oxygen barrier, but exhibits a water vapor barrier substantially smaller than that of PCTFE. If the same water vapor barrier is to be achieved with PVDC as with PCTFE, the thickness of PVDC has to be 165% of the thickness of PCTFE. PVDC films and, respectively, layers are usually produced by applying many thin sublayers. By way of example, the weight per unit area of PVDC required to achieve a water vapor barrier of 0.035 g/(m$^2 \cdot$24 h) (measured at a temperature of 38° C. and a relative humidity of 90%) would be about 400 g/m$^2$. This requires 40 passes through the machinery of a conventional industrial coating system in each case applying 10 g/m$^2$, or 27 passes at 15 g/m$^2$. Such a large number of passes through machinery is not achievable either technically or economically. The industrial processes known in the prior art produce PVDC layers with weight per unit area of up to at most 180 g/m$^2$.

The oxygen barrier exhibited by PVDC is only very slightly affected by moisture, whereas by way of example EVOH, which likewise exhibits a very good oxygen barrier, suffers major loss of oxygen barrier on exposure to moisture. In extreme cases, the magnitude of the loss in the case of EVOH extends to powers of ten. EVOH is usually used in packaging for food or drink, but has also recently been used in pharmaceutical packaging.

SUMMARY OF ADVANTAGEOUS EMBODIMENTS OF THE INVENTION

It is an object of the present invention to provide a film which exhibits a high barrier effect with respect to water vapor in combination with a barrier effect against oxygen, while use of material is at the same time efficient, and which provides good processability and complies with design requirements, e.g. in respect of optical transparency. A particular intention is to provide a film which is suitable for producing base components for blister packs.

DETAILED DESCRIPTION OF ADVANTAGEOUS EMBODIMENTS OF THE INVENTION

Figure 1:
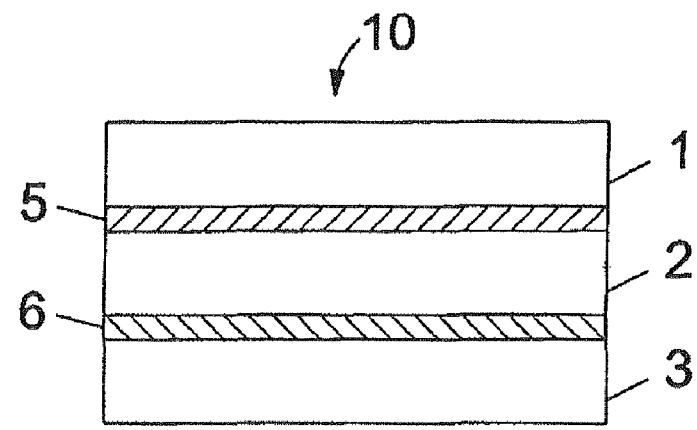
FIG. 1 illustrates an exemplary multilayer film having three layers.

The invention achieves the above object via a multilayer film with the features of claim 1. Accordingly, the multilayer film in question includes at least three layers, encompassing a first layer made of a polymer selected from the group consisting of polyvinyl chloride, copolymers made of vinyl chloride units and of one or more other monomers (VC copolymers), polyesters, polyolefins, polyacrylonitrile (PAN), copolymers made of acrylonitrile units and of one or more other monomers (AN copolymers), mixtures made of polyvinyl chloride and of VC copolymers;

a second layer made of a vinylidene chloride polymer selected from the group consisting of polyvinylidene chloride, copolymers made of vinylidene chloride units and of one or more other monomers (VDC copolymers), mixtures made of polyvinylidene chloride and of VDC copolymers;

and a third layer made of a chlorotrifluoroethylene polymer selected from the group consisting of polychlorotrifluoroethylene, copolymers made of chlorotrifluoroethylene units and of one or more other monomers (CTFE copolymers), mixtures made of polychlorotrifluoroethylene and of CTFE copolymers.

The multilayer film preferably encompasses a fourth layer made of a polymer selected from the group consisting of polyvinyl chloride, copolymers made of vinyl chloride units and of one or more other monomers (VC copolymers), polyesters, polyolefins, polyacrylonitrile (PAN), copolymers made of acrylonitrile units and of one or more other monomers (AN copolymers), mixtures made of polyvinyl chloride and of VC copolymers.

The polyesters used for the first and fourth layer preferably comprise polyethylene terephthalate (PET), in particular amorphous PET (APET), and copolymers made of ethylene terephthalate units and of one or more other monomers. One particularly preferred copolymer is PETG, which is composed of ethylene terephthalate units and of cyclohexanedimethanol units.

The polyolefin used for the first and fourth layer especially preferably comprises polypropylene (PP), polyethylene (PE), cycloolefin copolymers (COCs), and cycloolefin polymers (COP).

For the purposes of the invention, the abbreviations PVC, PVDC, and PCTFE are used for the polymers of the first, second, and third layer, where PVC is a vinyl chloride polymer selected from the group consisting of polyvinyl chloride, copolymers made of vinyl chloride units or, respectively, chloroethene units and of one or more other monomers (VC copolymers), and mixtures made of polyvinyl chloride and of VC copolymers;

PVDC is a vinylidene polymer selected from the group consisting of polyvinylidene chloride, copolymers made of vinylidene chloride units or, respectively, 1,1-dichloroethane units and of one or more other monomers (VDC copolymers), mixtures made of polyvinylidene chloride and of VDC copolymers;

and

PCTFE is a chlorotrifluoroethylene polymer selected from the group consisting of polychloro-trifluoroethylene, copolymers made of chlorotri-fluoroethylene units and of one or more other monomers (CTFE copolymers), mixtures made of polychlorotrifluoroethylene and of CTFE copolymers.

The sequence of the layers in the layer structure can be varied. The layers can be combined, thus obtaining layer structures made of PVC/PCTFE/PVDC, PVC/PVDC/PCTFE, PVC/PVDC/PCTFE/PVC, PVC/PCTFE/PVC/PVDC, PVC/PVDC/PVC/PCTFE, and also equivalent layer structures in which the first and fourth layer include, instead of PVC, a polyester, polyolefin, polyacrylonitrile (PAN), or AN copolymer.

The composition of material in the multilayer film of the invention is in particular PVC/PVDC/PCTFE or PVC/PVDC/PCTFE/PVC.

The multilayer film moreover encompasses one or more adhesive layers and one or more primer layers, where the individual adhesive layer and/or the individual primer layer has/have been arranged between respectively two of the layers.

Figure 2:
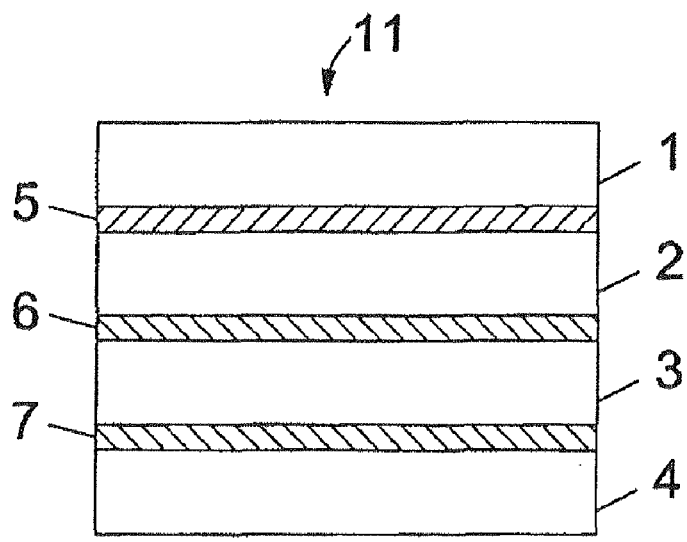
FIG. 2 illustrates an exemplary multilayer film having four layers.

Figures will be used below to explain the invention in more detail;

FIG. 1 shows a multilayer film having three layers; and
FIG. 2 shows a multilayer film having four layers.

FIG. 1 shows an example of a multilayer film 10 of the invention having three layers 1, 2, and 3, where the layer 1 is composed of at least 85% by weight of PVC, based on the total weight of the layer 1; the layer 2 is composed of at least 95% by weight of PVDC, based on the total weight of the layer 2; and the layer 3 is composed of at least 95% by weight of PCTFE, based on the total weight of the layer 3.

In an embodiment of the invention, the multilayer film 10 encompasses one or more primer layers 5 and/or one or more adhesive layers 6, arranged between respectively two of the layers 1, 2, and 3.

FIG. 2 shows another multilayer film 11 of the invention, which encompasses a further layer 4, which is composed of at least 85% by weight of PVC, based on the total weight of the layer 4. The reference signs 1, 2 and 3 in FIG. 2 have the same meaning as in FIG. 1. In FIG. 2, a primer layer 5 and two adhesive layers 6 and 7 are moreover shown.

The optional use of a primer layer 5 and/or of an adhesive layer 6, 7 depends on the respective process used to produce the multilayer film 10, 11.

Primers are used to provide adhesion of PVDC dispersion coatings, and dry lamination adhesives are used for the adhesive bonding of two film webs. If the multilayer film 10, 11 is produced, for example, by means of coextrusion of the layers 1, 2, 3, and 4, primer layers and adhesive layers are omitted. Production by means of coextrusion often uses what are known as tie layers for the bonding of the individual layers.

The layers 1, 2, 3, 4 of the multilayer films 10 and 11 of the invention can also have been arranged in another sequence, for example in one of the following configurations:
1/3/2 (=PVC/PCTFE/PVDC);
1/3/4/2 (=PVC/PCTFE/PVC/PVDC); or
1/2/4/3 (=PVC/PVDC/PVC/PCTFE).

The multilayer film 10, 11 can encompass, alongside the layers 1, 2, 3, and 4, further layers made of polymeric materials, aluminum, or paper.

It is preferable that each of the layers 1 and 4 encompasses up to 15% by weight of additives, and that each of the layers 2 and 3 encompasses up to 5% of additives, based on the total weight of the respective layer.

The layers 1, 4 preferably have a thickness of from 10 to 400 µm; the layer 2 preferably has a thickness of from 9 to 120 µm; and the layer 3 preferably has a thickness of from 15 to 210 µm.

The thickness of the layer 2 is in particular from 70 to 110 µm, and the weight per unit area thereof is in the range from 120 to 180 g/m².

The reciprocal of the water vapor transmission of the multilayer film 10, 11 is greater by at least 5% than the sum of the reciprocals of the water vapor transmissions of the individual layers in accordance with the following relationship $$\frac{1}{WVT_M} \geq 1.05 \sum_{j=1}^{N} \frac{1}{WVT_j}$$

where $WVT_M$ is the water vapor transmission of the multilayer film, $WVT_j$ is the water vapor transmission of the jth layer, and N is a natural number greater than or equal to 3, and N is the number of layers in the multilayer film.

It is preferable that the multilayer film 10, 11 is greater by at least 10%, preferably by at least 15%, and in particular by at least 20%, than the sum of the reciprocals of the water vapor transmissions of the individual layers.

The multilayer film 10, 11 has a water vapor transmission of from 0.027 to 0.034 g/(m²·24 h), at a temperature of 38° C. and at a relative humidity of 90%, preferably from 0.027 to 0.031 g/(m²·24 h). For the purposes of the invention, water vapor transmission is measured to DIN ISO 15106-3.

The oxygen transmission of the multilayer film 10, 11 at a temperature of 23° C., lower than that used to measure the water vapor transmission, and at a relative humidity of 50% is from 0.10 to 0.22 cm³/(m²·24 h), preferably from 0.13 to 0.14 cm³/(m²·24 h). Oxygen transmission is determined to DIN ISO 15105-2 Annex A.

The multilayer film 10, 11 of the invention has good thermoformability and is monolaterally or bilaterally sealable.

A multilayer film 10, 11 is preferably colorless and transparent, colored and transparent, colored and opaque, or white and opaque.

Another feature of the multilayer film 10, 11 of the invention is that when heated it has very good thermo-forming properties, far exceeding the thermoformability of conventional PVC/PCTFE composite films. Because the multilayer film 10, 11 of the invention has good thermoforming properties, the water vapor barrier is relatively little impaired by the thermoforming procedure. The multilayer film 10, 11 of the invention therefore retains an unusually high water vapor barrier ("blister barrier") even when it has been thermoformed.

The high oxygen barrier exhibited by the multilayer film 10, 11 of the invention is similar to the water vapor barrier in that it is relatively little impaired by the thermoforming procedure. Consequently, thermoforming can be used to produce blister packs from the multilayer film 10, 11 of the invention, and these have a barrier effect that was hitherto not achievable with respect to water vapor and oxygen.

A particular feature of the multilayer film of the invention is that, even after the thermoforming procedure, the reciprocal of the water vapor transmission of the multilayer film is greater by at least 10%, preferably by at least 15%, and in particular by at least 20%, than the sum of the reciprocals of the water vapor transmissions of the individual layers.

The thickness or, respectively, the weight per unit area of the optionally present primer layers and optionally present adhesive layers in the multilayer film 10, 11 of the invention makes up only a small proportion of the total thickness or, respectively, the weight per unit area of the multilayer film 10, 11, and the barrier effect exhibited by the primer layer and by the adhesive layer can therefore be ignored.

The invention provides a blister pack having a blister base component made of a multilayer film 10, 11 having one or more of the abovementioned features.

Features of other advantageous embodiments of the blister pack of the invention are that:
the blister base component has been subjected to a sealing process with a film which has been sealed against the blister base component;
the film sealed against the blister base component is composed of aluminum and has a thickness which is preferably from 5 to 80 µm;
the film sealed against the blister base component is composed of plastic;
the film sealed against the blister base component is an aluminum film of thickness from 5 to 40 µm, which has been coated with a plastic on the side sealed against the blister base component, or which has been laminated with a plastics film.

EXAMPLES

Production of Multilayer Films

Four multilayer films composed of materials as follows: PVC/PVDC/PCTFE/PVC were produced on an inline system having a plurality of coating units and, respectively, lamination units, by steps (i)-(iv) stated below:
(i) coating of a first PVC film with adhesion promoter (primer) to prepare for the application of PVDC dispersion;
(ii) repeated coating with PVDC dispersion until cumulative area density was from 125 to 160 g/m² (dry application weight);
(iii) using a first dry lamination adhesive to apply a PCTFE film to the PVDC layer by lamination; and
(iv) using a second dry lamination adhesive to apply a second PVC film to the PCTFE film by lamination.

Water Vapor Transmission Measurement
a) Measurement of the water vapor transmission $WVT_{rj}$ of single-layer reference films made of PVC (thickness 127 µm), made of PCTFE (thickness 102 µm), and made of PVDC (thickness 75 and, respectively, 95 µm) to DIN ISO 15106-3.
b) Measurement of the water vapor transmission $WVT_{Mm}$ of the multilayer film to DIN ISO 15106-3.
c) Determination of the thickness $d_j$ of the polymer layer present in the multilayer film via measurement of cross-sectional micrographs of the multilayer film.
d) Calculation of the water vapor transmission $WVT_j$ of the polymer layers present in the multilayer film from the following equation:

$$WVT_j = WVT_{rj} \cdot d_{rj}/d_j$$

where $d_{rj}$ indicates the thickness of the single-layer reference film from step a) and $d_j$ indicates the thickness determined in step c) of the polymer layer present in the multilayer film.
e) Calculation of the water vapor transmission $WVT_{Mc}$ of the multilayer film by analogy with resistances collected in series, i.e. in the form of sum of the reciprocals of the water vapor transmissions $WVT_j$ from the following formula:

$$\frac{1}{WVT_{Mc}} = \sum_{j=1}^{4} \frac{1}{WVT_j}$$

The measured and calculated values for the water vapor transmission of the multilayer films produced in the invention are compared in table 1.

TABLE 1

| # | PVC µm | PVDC g/m² | PCTFE µm | PVC µm | $WVT_{Mm}$ measured g/(m²·24 h) | $WVT_{Mc}$ calculated g/(m²·24 h) | $\Delta WVT = (WVT_{Mc} - WVT_{Mm})/WVT_{Mc}$ % |
|---|---|---|---|---|---|---|---|
| 1 | 127 | 125.2 | 102.4 | 127 | 0.0333 | 0.0368 | 9.5 |
| 2 | 127 | 125.4 | 104.2 | 127 | 0.0279 | 0.0363 | 23.1 |
| 3 | 127 | 160.7 | 99.5 | 127 | 0.0315 | 0.0344 | 8.4 |
| 4 | 127 | 160.2 | 101.0 | 127 | 0.0279 | 0.0341 | 18.2 |

Surprisingly, it is found that the water vapor transmissions measured on the multilayer films of the invention are smaller by at least 8.4% than the values that will be expected on the basis of the combined effect of the individual polymer layers, i.e. the values obtained by taking the sum of the reciprocals of the water vapor transmissions.

What is claimed is:
1. A multilayer film having at least three layers comprising a first layer comprising a polymer selected from the group consisting of polyvinyl chloride, copolymers made of vinyl chloride units and of one or more other monomers, polyethylene terephthalate, polyolefins, polyacrylonitrile, copolymers made of acrylonitrile units and of one or more other monomers, and mixtures made of polyvinyl chloride and of copolymers made of vinyl chloride units and one or more other monomers;
a second layer comprising a vinylidene chloride copolymer selected from the group consisting of polyvinylidene chloride, copolymers made of vinylidene chloride units and of one or more other monomers, and mixtures made of polyvinylidene chloride and of copolymers made of vinylidene chloride units and one or more other monomers;
and
a third layer comprising a chlorotrifluoroethylene polymer selected from the group consisting of polychlorotrifluoroethylene, copolymers made of chlorotrifluoroethylene units and of one or more other monomers, and mixtures made of polychlorotrifluoroethylene and copolymers made of chlorotrifluoroethylene units,
wherein said film has an oxygen transmission of from 0.10 to 0.22 cm³/(m²·24 h), at a temperature of 23° C. and at a relative humidity of 50%.

2. The multilayer film as claimed in claim 1, wherein said film further comprises a fourth layer made of a polymer selected from the group consisting of polyvinyl chloride, copolymers made of vinyl chloride units and of one or more other monomers, polyethylene terephthalate, polyolefins, polyacrylonitrile, copolymers made of acrylonitrile units and of one or more other monomers, and mixtures made of polyvinyl chloride and copolymers made of vinyl chloride units and of one or more other monomers.

3. The multilayer film as claimed in claim 2, wherein said film comprises one or more adhesive layers, and one or more primer layers, where the adhesive layer and/or the primer layer has/have been arranged between respectively two of the first, second, third and fourth layers.

4. The multilayer film as claimed in claim 2, wherein each of the first and fourth layers comprises up to 15% by weight of additives, and each of the second and third layers comprises up to 5% by weight of additives, based on the total weight of the respective layer.

5. The multilayer film as claimed in claim 2, wherein the first and fourth layer have a thickness of from 10 to 400 µm, the second layer has a thickness of from 9 to 120 µm, and the third layer has a thickness of from 15 to 210 µm.

6. The multilayer film as claimed in claim 1, wherein the thickness of the second layer is from 70 to 110 μm, and the weight per unit area thereof is from 120 to 180 g/m².

7. The multilayer film as claimed in claim 1, wherein the reciprocal of the water vapor transmission of said multilayer film is greater by at least 5% than the sum of the reciprocals of the water vapor transmissions of the individual layers of said film in accordance with the following relationship $$\frac{1}{WVT_M} \geq 1.05 \sum_{j=1}^{N} \frac{1}{WVT_j}$$

where $WVT_M$ is the water vapor transmission of the multilayer film, $WVT_j$ is the water vapor transmission of the jth layer, and N is a natural number greater than or equal to 3, and N is the number of layers in the multilayer film.

8. The multilayer film as claimed in claim 7, wherein the reciprocal of the water vapor transmission of the multilayer film is greater by at least 10% than the sum of the reciprocals of the water vapor transmissions of the individual layers.

9. The multilayer film as claimed in claim 1, wherein said film has a water vapor transmission of from 0.027 to 0.034 g/(m²·24 h), at a temperature of 38° C. and at a relative humidity of 90%.

10. The multilayer film as claimed in claim 1, wherein said film is thermoformable.

11. The multilayer film as claimed in claim 10, wherein the reciprocal of the water vapor transmission is greater by at least 10% than the sum of the reciprocals of the water vapor transmissions of the individual layers after thermoforming.

12. The multilayer film as claimed in claim 1, wherein said film is monolaterally or bilaterally sealable.

13. The multilayer film as claimed in claim 1, wherein said film is colorless and transparent, colored and transparent, colored and opaque, or white and opaque.

14. The multilayer film as claimed in claim 3, wherein the primer layer has a weight per unit area of from 0.5 to 20 g/m².

15. The multilayer film as claimed in claim 3, wherein the adhesive layer has a weight per unit area of from 1 to 30 g/m².

16. The multilayer film as claimed in claim 1, wherein said film has a layer structure selected from the following group: PVC/PCTFE/PVDC, PVC/PVDC/PCTFE, PVC/PVDC/PCTFE/PVC, PVC/PCTFE/PVC/PVDC, PVC/PVDC/PVC/PCTFE, and also equivalent layer structures in which the first and fourth layer include, instead of PVC, a polyester, polyolefin, polyacrylonitrile, or AN copolymer.

17. A blister pack, comprising a blister base component that is further comprised of a multilayer film as claimed in claim 1.

18. The blister pack as claimed in claim 17, wherein the blister base component has been sealed by a film which has been sealed against the blister base component.

19. The blister pack as claimed in claim 18, wherein the film sealed against the blister base component comprises aluminum.

20. The blister pack as claimed in claim 18, wherein the film sealed against the blister base component comprises of plastic.

21. The blister pack as claimed in claim 18, wherein the film sealed against the blister base component is an aluminum film with a thickness of from 5 to 40 μm, which, on the side sealed against the blister base component, has been coated with a plastic, or has been laminated with a plastic film.

22. The multilayer film as claimed in claim 8, wherein the reciprocal of the water vapor transmission of the multilayer film is greater by at least 15% than the sum of the reciprocals of the water vapor transmissions of the individual layers.

23. The multilayer film as claimed in claim 8, wherein the reciprocal of the water vapor transmission of the multilayer film is greater by at least 20% than the sum of the reciprocals of the water vapor transmissions of the individual layers.

24. The multilayer film as claimed in claim 9, wherein said film has a water vapor transmission of from 0.027 to 0.031 g/(m²·24 h).

25. The multilayer film as claimed in claim 1, wherein said film has an oxygen transmission of from 0.13 to 0.14 cm³/(m²·24 h).

26. The multilayer film as claimed in claim 11, wherein the reciprocal of the water vapor transmission of the film is greater by at least 15% than the sum of the reciprocals of the water vapor transmissions of the individual layers.

27. The multilayer film as claimed in claim 11, wherein the reciprocal of the water vapor transmission of the film is greater by at least 20% than the sum of the reciprocals of the water vapor transmissions of the individual layers.

28. The blister pack as claimed in claim 19, wherein the film has a thickness of from 5 to 80 μm.

* * * * *